(12) United States Patent
Baur et al.

(10) Patent No.: US 10,487,886 B2
(45) Date of Patent: Nov. 26, 2019

(54) CLAW SHIFTING ELEMENT

(71) Applicant: ZF Friedrichshafen AG, Friedrichshafen (DE)

(72) Inventors: Markus Baur, Langenargen (DE); Peter Tiesler, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 70 days.

(21) Appl. No.: 15/833,282

(22) Filed: Dec. 6, 2017

(65) Prior Publication Data
US 2018/0163792 A1    Jun. 14, 2018

(30) Foreign Application Priority Data
Dec. 14, 2016   (DE) .................. 10 2016 224 901

(51) Int. Cl.
| | |
|---|---|
| *F16D 25/061* | (2006.01) |
| *F16D 11/14* | (2006.01) |
| *F16H 59/68* | (2006.01) |
| *F16H 63/30* | (2006.01) |
| *G01D 5/14* | (2006.01) |

(52) U.S. Cl.
CPC .......... *F16D 25/061* (2013.01); *F16D 11/14* (2013.01); *F16H 59/68* (2013.01); *F16H 63/3023* (2013.01); *G01D 5/142* (2013.01); *F16D 2300/18* (2013.01); *F16H 2059/6807* (2013.01)

(58) Field of Classification Search
CPC .... F16D 25/061; F16D 11/14; F16D 2300/18; F16H 59/68; F16H 63/3023; F16H 2059/6807; G01D 5/142
See application file for complete search history.

(56) References Cited

U.S. PATENT DOCUMENTS

| | | | | |
|---|---|---|---|---|
| 8,177,040 | B2 * | 5/2012 | Matsushita | ........... B60T 13/746 188/158 |
| 9,933,024 | B2 * | 4/2018 | Mordukhovich | ..... F16D 41/088 |
| 9,976,650 | B1 * | 5/2018 | Singh | .................. F16H 63/3069 |
| 10,066,675 | B2 * | 9/2018 | Black | .................... F16D 25/061 |
| 2008/0290760 | A1 * | 11/2008 | Matsushita | ........... F16D 55/226 310/67 R |
| 2017/0328419 | A1 * | 11/2017 | Doepfert | ............... F16D 25/061 |

* cited by examiner

*Primary Examiner* — Tinh T Dang
(74) *Attorney, Agent, or Firm* — Dority & Manning, P.A.

(57) ABSTRACT

A shift element (4) for an automatic transmission having a hydraulically actuable piston; at least one hydraulic duct (10); an axially movable first shift element half (3, 7) operatively connected to the piston; a second shift element half (8); a bearing carrier (9); a ring-shaped component (1); and a Hall sensor (6) in the bearing carrier (9). The first shift element half (3) has a notch-like encoder contour (5) for the Hall sensor (6). The ring-shaped component (1) is composed of a non-magnetic material transparent to the Hall sensor (6). The ring-shaped component (1) is designed and arranged on the outer diameter of the first shift element half (3), such that an air gap between the notch-like encoder contour (5) and the Hall sensor (6) is filled by the ring-shaped component (1), and hydraulic oil flows in the remaining region along the circumference of the first shift element half (3).

9 Claims, 3 Drawing Sheets

CLAW SHIFTING ELEMENT

FIELD OF THE INVENTION

The present invention relates to a shift element for an automatic transmission, particularly a dog-clutch shift element.

BACKGROUND

Shift elements for automatic transmissions are clutches or brakes and generally include a hydraulically or pneumatically actuable piston, which has a piston chamber in which the hydraulic medium or the pressure medium is situated, an axially movable clutch half which is operatively connected to the piston, and an axially static clutch half. Shift elements may also be actuated electromechanically.

From the prior art, it is known in the case of automatic transmissions for positively locking shift elements, in particular dog-clutch shift elements, to be used instead of frictional shift elements as shift elements. Advantageously, this results in with lower production costs and less structural space being required. Furthermore, the drag torques are reduced, whereby the transmission efficiency is increased.

Dog-clutch shift elements generally include an axially movable dog, which is operatively connected to the piston and which has a dog toothing, and a counterpart dog as clutch body with a dog toothing with which the dog toothing of the dog meshes when in the engaged state. The dog may in this case preferably be a sliding sleeve.

In the case of dog-clutch shift elements, a device for detecting the travel of the axially movable dog is generally provided, which detects the exact axial position of the axially movable dog after the triggering of the engaging of the dog. Based on the detection of the exact axial position of the axially movable dog, deviations from the set-point profile are correctable. A Hall sensor arranged in the bearing carrier of the dog-clutch shift element is preferably used for detecting the travel of the axially movable dog, wherein the dog has an encoder contour which is suitable for the Hall sensor and which is preferably configured in the manner of a notch. This travel detection can also be used analogously for frictionally locking shift elements.

In the case of Hall sensors, the signal is disadvantageously manipulated or falsified by metallic particles. Since "metallic dirt" forms in a transmission as a result of abrasion or as a result of the assembly process, the metallic dirt can influence the sensor signal. If a metallic particle is situated in front of the sensor, this manipulates the sensor signal such that the sensor indicates an axial position other than the true axial position of the axially movable dog.

SUMMARY OF THE INVENTION

Example aspects of the present invention are based on the object of specifying a shift element, in particular a dog-clutch shift element, having a hydraulically actuable piston, an axially movable dog which is operatively connected to the piston and which has a dog toothing, and a counterpart dog with a counterpart dog toothing with which the dog toothing of the axially movable dog meshes when in the engaged state, wherein the detection of the travel of the axially movable dog is realized by a Hall sensor, wherein the axially movable dog has an encoder contour for the Hall sensor, wherein the encoder contour is protected against dirt particles, in particular against metallic particles, which can lead to disruption or falsification of the measurement signal, without closure of the hydraulic duct or limitation of the volume flow passing through said hydraulic duct for the actuation of the dog-clutch shift element.

Accordingly, a shift element which is suitable for an automatic transmission is proposed. The shift element includes a hydraulically actuable piston, at least one hydraulic duct, an axially movable first shift element half operatively connected to the piston, and a second shift element half. Here, the shift element has a Hall sensor arranged in a bearing carrier of the shift element for the purposes of detecting the travel of the axially movable first shift element half. The axially movable first shift element half of the shift element has a notch-like encoder contour for the Hall sensor.

According to the invention, the shift element has a ring-shaped component composed of a non-magnetic material which is transparent to the Hall sensor, the ring-shaped component is designed and arranged on the outer diameter of the axially movable first shift element half, such that the air gap between the notch-like encoder contour and the Hall sensor is filled by the non-magnetic material of the ring-shaped component, and hydraulic oil can flow in the remaining region along the circumference of the axially movable shift element half.

Here, the bearing carrier may preferably be a housing or part of the transmission housing.

The ring-shaped component is preferably formed at a maximum outer diameter only in the region between the encoder contour and the Hall sensor, wherein the outer diameter of the ring-shaped component in further regions is configured such that the at least one hydraulic duct for the actuation of the shift element is not closed and the volume flow is not limited.

It is possible for the ring-shaped component to be connected to the axially movable shift element half and to be axially moved jointly therewith. The ring-shaped component may be of single-part or multi-part form as viewed along the circumference, wherein, in the case of a two-part form, the connection of the two parts to one another is realized by a locking device. In the exemplary embodiment shown, the locking device is a snap-action hook fastener. As an alternative to this, the locking device could also be a ring lock. In the case of a single-part form, the two ends of the component are preferably connected to one another by a snap-action hook fastener. The ring-shaped component, whether of single-part or multi-part form, is preferably produced from plastic.

In a particularly advantageous embodiment of the invention, the shift element is a dog-clutch shift element. Here, the first shift element half is an axially movable dog which is operatively connected to the piston and which has a dog toothing, and the second shift element half is a counterpart dog with a counterpart dog toothing. Here, the dog toothing of the axially movable dog meshes with the counterpart dog toothing of the counterpart dog when in the engaged state. In this embodiment, the axially movable dog of the dog-clutch shift element has a notch-like encoder contour for the Hall sensor.

The axially movable dog must be installed "directionally" such that the notch-like encoder contour is arranged opposite the Hall sensor; furthermore, the ring-shaped component provided according to the invention must be mounted "directionally" onto the axially movable dog.

Through the design according to the invention, the magnetic field, required for the detection of the travel of the axially movable dog, between the Hall sensor and the encoder contour is not shielded and is advantageously not falsified by metallic particles.

BRIEF DESCRIPTION OF THE DRAWINGS

The invention will be discussed in more detail by way of example below on the basis of the appended figures, where the same reference numerals and characters are used for those components that are structurally and functionally the same. The following is shown:

FIG. 1 is mounted;

DETAILED DESCRIPTION

Figure 1:
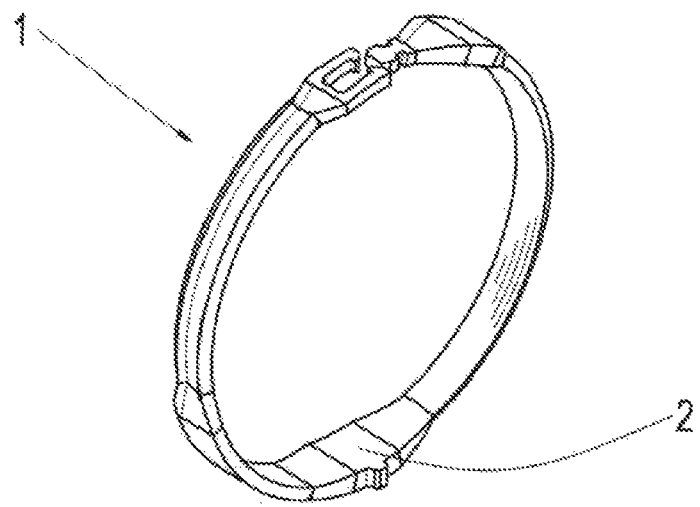
FIG. 1 illustrates a schematic perspective view of a ring-shaped component designed according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The construction of dog-clutch shift elements is very well known to a person skilled in the art, and therefore only the components relevant to the invention will be described and discussed in the context of the description of the figures.

According to the invention, and referring to the appended figures, a dog-clutch shift element 4 has a hydraulically actuable piston P, an axially movable dog 3, which is operatively connected to the piston P and which has a dog toothing 7, and a counterpart dog 12, which has a counterpart dog toothing 8 with which the dog toothing 7 of the axially movable dog meshes when in the engaged state. A Hall sensor 6 is provided in a bearing carrier, the bearing carrier being a transmission housing 9, of the dog-clutch shift element 4 for the purposes of detecting the travel of the axially movable dog 3, the axially movable dog 3 having a notch-like encircling encoder contour 5 for the Hall sensor 6 and a ring-shaped component 1 composed of a non-magnetic material which is transparent to the Hall sensor 6, for example composed of plastic, the ring-shaped component 1 being designed and arranged on the outer diameter of the axially movable dog 3, such that the air gap between the notch-like encoder contour 5 and the Hall sensor 6 is filled by the non-magnetic material of the ring-shaped component 1, and that hydraulic oil can flow in the remaining region along the circumference of the axially movable dog 3. Here, the dog 3 is a sliding sleeve. The bearing carrier 9 is formed as part of a transmission housing.

Figure 2:
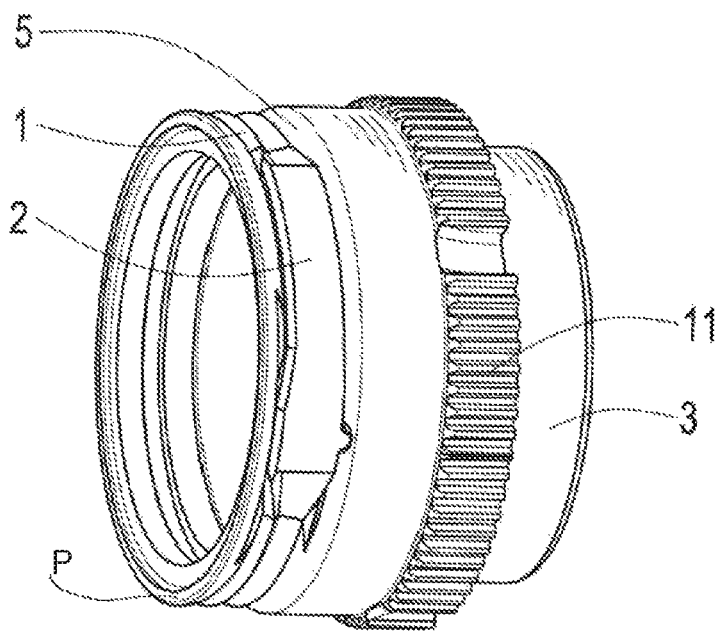
FIG. 2 illustrates a schematic perspective view of an axially movable dog of a dog-clutch shift element, on which a ring-shaped component as per
Figure 5:
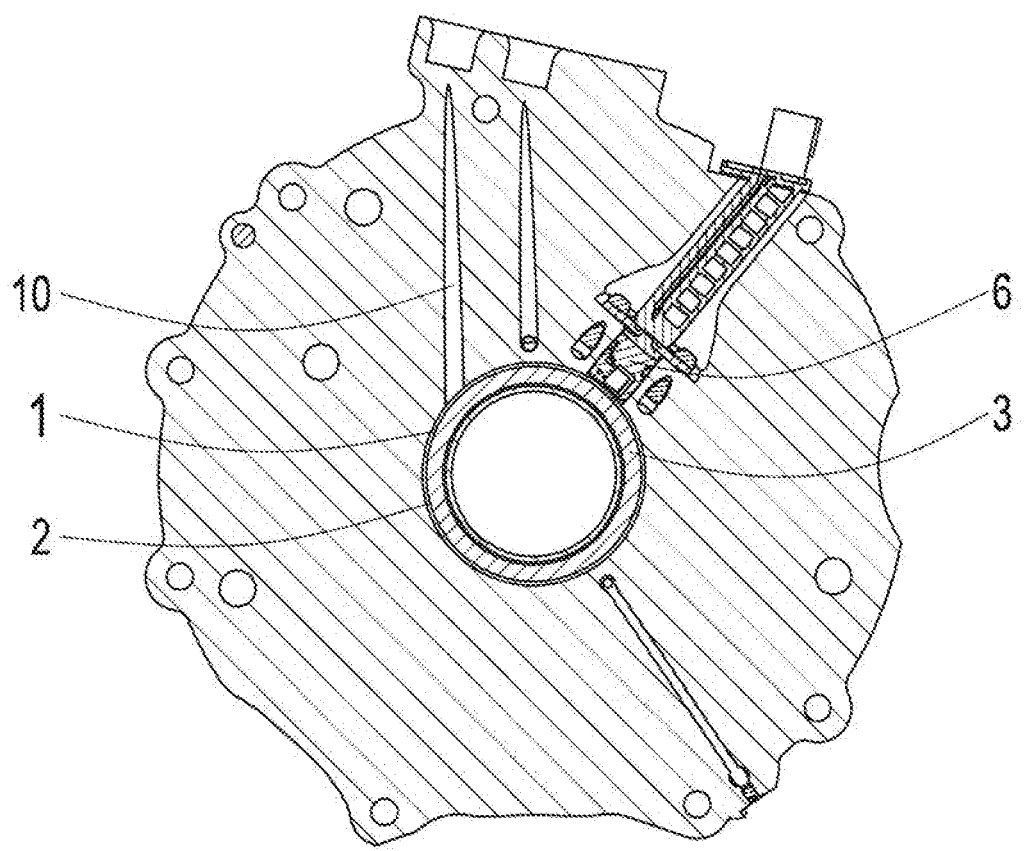
FIG. 5 illustrates a schematic sectional view A-A from FIG. 4 of the axially movable dog on which a ring-shaped component according to the invention is mounted, of the Hall sensor provided for detecting the travel, and of the hydraulic duct for the actuation of the dog-clutch shift element.

A ring-shaped component 1 according to the invention is illustrated in FIG. 1; a region 2 of the ring-shaped component 1 fills the air gap between the notch-like encoder contour 5 of the axially movable dog 3 and the Hall sensor 6 in a mounted state. Said region 2 is formed at a maximum outer diameter, wherein, in the further regions, the outer diameter of the ring-shaped component 1 is configured such that, as illustrated on the basis of FIG. 5, the at least one hydraulic duct 10 for the hydraulic actuation of the dog-clutch shift element 4 is not closed and the volume flow is not limited. FIG. 2 shows an axially movable dog 3 onto which a ring-shaped component 1 has been fitted. Guide toothing 11, being an external toothing on an outer contour of the dog 3, in the installed state meshes with an internally toothed guide toothing of the bearing carrier, the bearing carrier being transmission housing 9. In this way, the dog 3 is connected rotationally conjointly to, but is axially displaceable relative to, the transmission housing 9.

Figure 3:
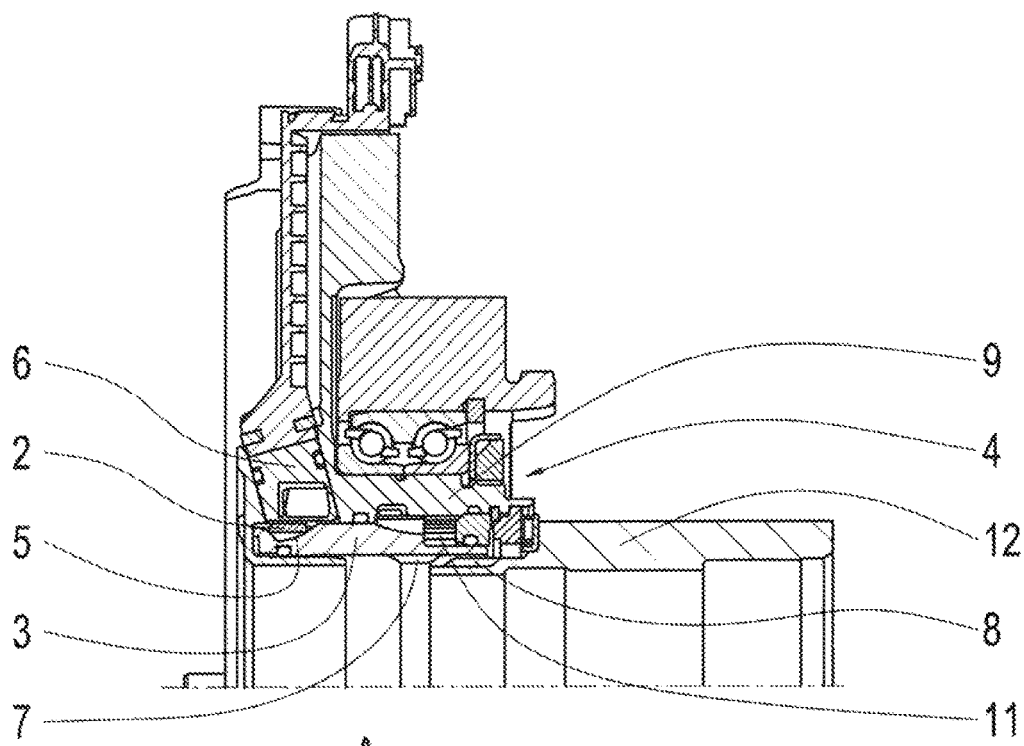
FIG. 3 illustrates a schematic sectional view of a dog-clutch shift element designed according to the invention with a disengaged axially movable dog.
Figure 4:
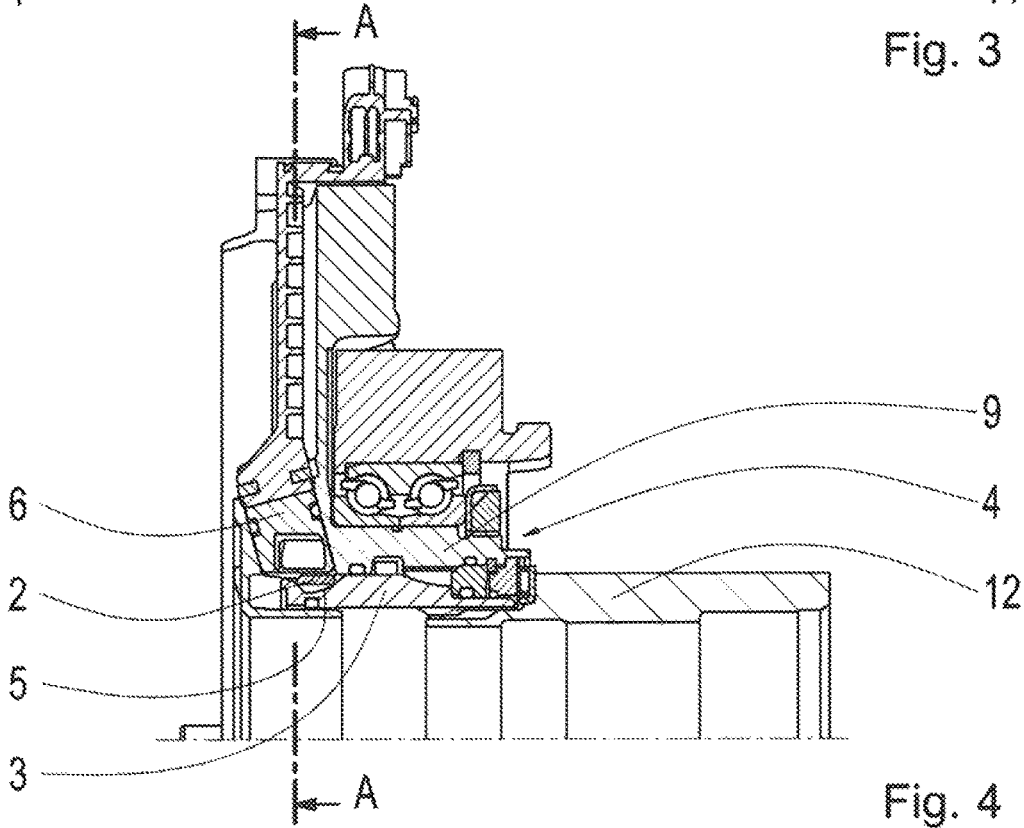
FIG. 4 illustrates a schematic sectional view of the dog-clutch shift element designed according to the invention as per FIG. 3 with an engaged axially movable dog.

FIG. 3 illustrates, in a partial longitudinal section of an automatic transmission, a dog-clutch shift element 4 with a disengaged axially movable dog 3. The dog toothing 7 of the dog 3 is axially spaced apart from the dog toothing 8 of a counterpart dog 12. Owing to the design according to the invention, the air gap between the notch-like encoder contour 5 and the Hall sensor 6 is filled by the non-magnetic material, which is transparent to the Hall sensor 6, of the region 2 of the ring-shaped component 1, whereby the hydraulic oil can flow in the remaining region along the circumference of the axially movable dog 3, such that the functionality of the dog-clutch shift element 4 is not impaired. FIG. 4 shows the dog-clutch shift element 4 as per FIG. 1 and FIG. 3 with an engaged axially movable dog 3. Both in FIG. 3 and in FIG. 4, an encircling internally toothed dog toothing 7 is formed on an inner contour of the dog 3, which dog toothing 7 is illustrated in the engaged state in FIG. 4. Here, the dog toothing 7 meshes with a counterpart dog toothing 8. FIG. 4 shows a section line A-A, in the plane of which the sectional illustration of FIG. 5 lies.

Since the ring-shaped component 1 is moved axially conjointly with the axially movable dog 3, the air gap between the notch-like encoder contour 5 and the Hall sensor 6 is at all times filled by the non-magnetic material, which is transparent to the Hall sensor 6 of the region 2 of the ring-shaped component 1. In the exemplary embodiment as per FIGS. 3 and 4, the sensor unit comprising the Hall sensor 6 is installed obliquely in relation to the longitudinal axis of the bearing carrier 9 of the dog-clutch shift element 4.

Modifications and variations can be made to the embodiments illustrated or described herein without departing from the scope and spirit of the invention as set forth in the appended claims.

REFERENCE DESIGNATIONS

1 Ring-shaped component
2 Part of the ring-shaped component with maximum outer diameter
3 Axially movable dog
4 Dog-clutch shift element
5 Encoder contour
6 Hall sensor
7 Dog toothing of the axially movable dog
8 Counterpart dog toothing
9 Bearing carrier, transmission housing
10 Hydraulic duct
11 Guide toothing
12 Counterpart dog, clutch body

The invention claimed is:

1. A shift element (4) for an automatic transmission, the shift element (4) comprising:

a hydraulically actuable piston (P);
at least one hydraulic duct (10);
an axially movable first shift element half (3, 7), the axially movable first shift element half (3) being operatively connected to the piston (P);
a second shift element half (8);
a bearing carrier (9);
a ring-shaped component (1); and
a Hall sensor (6) arranged in the bearing carrier (9) for detecting the travel of the axially movable first shift element half (3),
wherein the axially movable first shift element half (3) of the shift element (4) has a notch-like encoder contour (5) for the Hall sensor (6),
wherein the ring-shaped component (1) is composed of a non-magnetic material, the non-magnetic material being transparent to the Hall sensor (6), and
wherein the ring-shaped component (1) is arranged on the outer diameter of the axially movable first shift element half (3) such that an air gap between the notch-like encoder contour (5) and the Hall sensor (6) is filled by the non-magnetic material of the ring-shaped component (1) and such that hydraulic oil is flowable in a remaining region along the circumference of the axially movable shift element half (3).

2. The shift element of claim 1, wherein a maximum outer diameter of the ring-shaped component (1) is formed between the encoder contour (5) and the Hall sensor (6), and the outer diameter of the ring-shaped component (1) in further regions is configured such that the at least one hydraulic duct (10) for the actuation of the shift element (4) is not closed by the ring-shaped component (1).

3. The shift element of claim 1, wherein the ring-shaped component (1) is a one-piece construction or an at least two-piece construction.

4. The shift element of claim 3, wherein the ring-shaped component (1) is the at least two-piece construction, and the at least two pieces of the ring-shaped component (1) are connected by a locking device.

5. The shift element of claim 4, wherein the locking device is a snap-action hook fastener.

6. The shift element of claim 3, wherein the ring-shaped component (1) is the one-piece construction, and the two ends of the ring-shaped component (1) are connected by a locking device.

7. The shift element of claim 6, wherein the locking device is a snap-action hook fastener or a ring lock.

8. The shift element of claim 1, wherein the ring-shaped component (1) is constructed of plastic.

9. The shift element of claim 1, wherein the shift element is a dog-clutch shift element (4), and the first shift element half (3) is an axially movable dog (3) which is operatively connected to the piston (P) and which has a dog toothing (7), the second shift element half (8) is a counterpart dog (12) with a counterpart dog toothing (8), and the dog toothing (7) of the axially movable dog (3) meshes with the counterpart dog toothing (8) of the counterpart dog (12) in an engaged state.

* * * * *